June 17, 1930.   T. J. APPLEBAKER   1,764,237
EQUALIZER BAR
Filed April 3, 1929
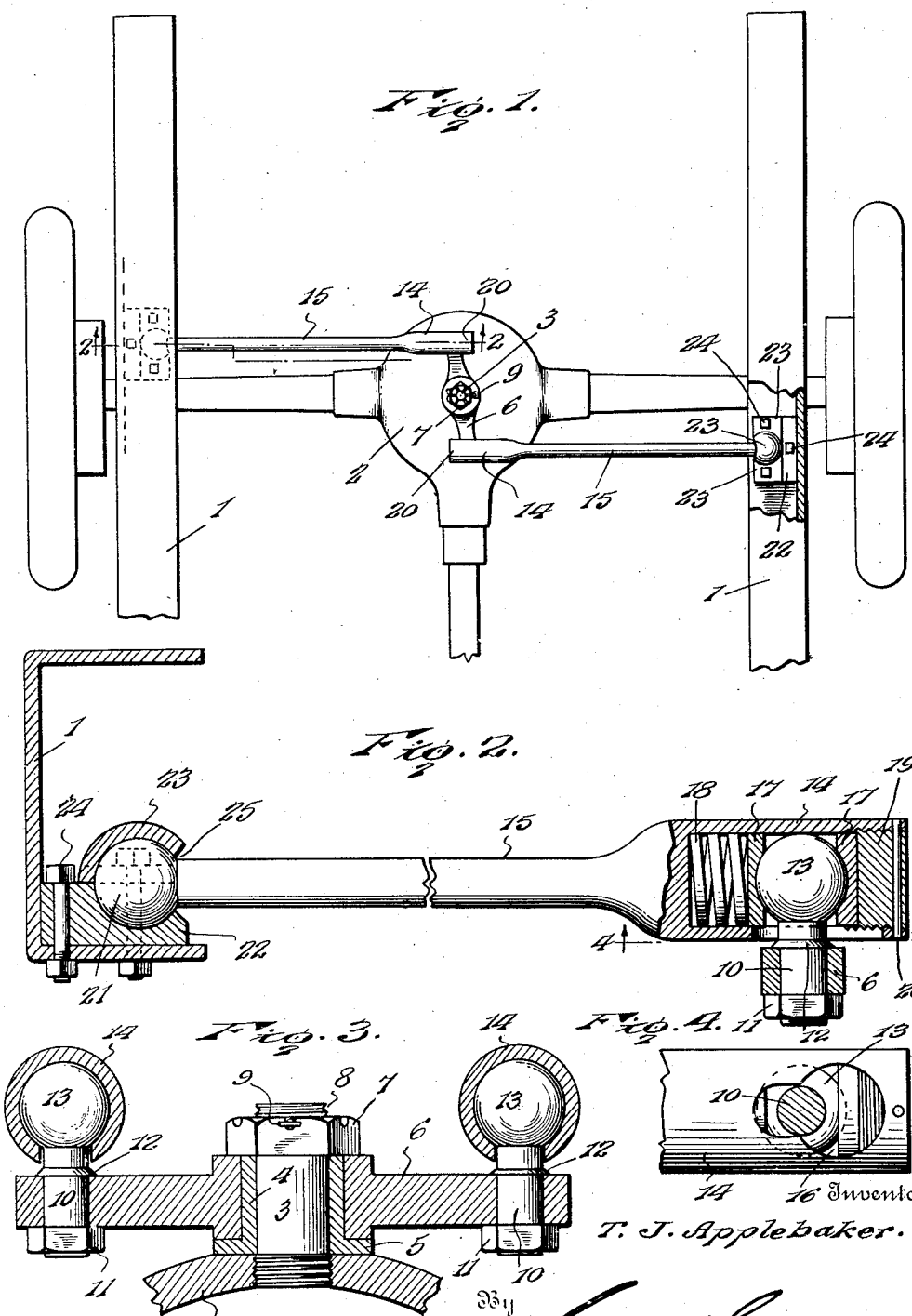

Patented June 17, 1930

1,764,237

UNITED STATES PATENT OFFICE

THERON J. APPLEBAKER, OF JACKSONVILLE, OREGON, ASSIGNOR OF ONE-HALF TO A. S. KLEINHAMMER, OF JACKSONVILLE, OREGON

EQUALIZER BAR

Application filed April 3, 1929. Serial No. 352,300.

The object of this invention is to provide a simple device which may be readily applied to any motor vehicle and which will operate efficiently to overcome side strains due to vibrations. The invention is illustrated in the accompanying drawing and will be hereinafter fully set forth.

In the drawing:

Figure 1 is a plan view, partly in section, of a portion of an automobile chassis having the invention applied thereto, Fig. 2 is an enlarged section on the line 2—2 of Fig. 1, Fig. 3 is a section taken through the equalizer bar, and Fig. 4 is a section on the line 4—4 of Fig. 2.

In the drawing, the reference numeral 1 indicates a portion of the side sills of an automobile chassis and 2 designates the differential housing. In carrying out the present invention, a threaded opening is bored in the top of the differential housing and a pivot bolt or stud 3 is fitted at its lower end in said opening. This pivot bolt or stud has a smooth surface intermediate its ends and a bushing 4 is fitted around said smooth surfaced portion. The bushing is provided with an annular flange 5 at its lower end and the equalizer bar 6 is pivotally mounted upon the bushing and supported by said flange, as shown clearly in Fig. 3. A retaining nut 7 is mounted upon the upper threaded end 8 of the pivot bolt and is preferably locked to the bolt by a cotter key or similar device, indicated at 9. The nut bears directly upon the bushing and extends over the same and rests upon the upper side of the equalizer bar so that the bar is held securely in place but may rock freely about the pivot. In the ends of the equalizer bar are formed openings in which are fitted pins or studs 10 having retaining nuts 11 mounted on their lower ends whereby they are secured in place, annular flanges or shoulders 12 being formed upon the upper portions of these pins to bear upon the upper surface of the equalizer bar and cooperate with the nuts to secure the pin in position. Balls 13 are formed on the upper ends of the respective pins, and these balls are received within tubular end portions 14 of links 15. The inner tubular extremities 14 of the links are provided with internally threaded open ends and in their bottoms are keyhole slots 16, it being understood that in assembling the parts the ball 13 is passed through the circular portion of the slot so as to fit within the tubular end member 14 and permit the shank of the pin 10 to enter the straight portion of the slot. Disposed within the tubular terminal 14 at opposite sides of the ball and engaged therewith are cupped washers 17, the inner washer being yieldably held to the ball by an expansion spring 18 coiled within the tubular member 14 and bearing against the washer and against the end of the socket or bore of said member. The outer washer is held to the ball by a plug 19 which is threaded into the open end of the socket and locked therein by a pin 20 inserted through alined openings in the plug and the wall of the socket, as shown clearly in Fig. 2. The outer end of each link 15 is formed into a ball 21 which is received in a socket secured on the sill 1 of the chassis. This socket comprises a base member or block 22 having a concave recess or seat in its upper side and a cap 23 disposed over and resting upon the base block 22 and provided with end flanges 23, fastening bolts 24 being inserted through the said flanges and the base block into the sill to secure the parts in place. The cap 23, of course, is convex in all directions of its inner surface to cooperate with the seat in the block 22 and form a spherical bearing for the ball 21. The inner side of the block and the cap present an opening 25 which accommodates the movement of the link in all directions.

It will be readily noted that I have provided an exceedingly simple and compact structure which will accommodate relative movement of the links and the equalizer bar but will effectually resist all tendency of the vehicle chassis to move laterally relative to the springs. The device is especially efficient in accommodating relative vertical movement of the chassis supporting springs and at the same time preventing relative lateral movement of the chassis. Should one of the supporting springs tend to compress without a corresponding movement in the other supporting spring, the springs 18 cooperating with the balls 13 will accommodate the inequalities in the movements of the two sides of the chassis while at the same time resisting any relative lateral movement of the same. This equalization is facilitated by the provisions of the keyhole slots in the bottoms of the sockets or terminals 14 inasmuch as these slots permit the pins or shanks 10 to move relatively longitudinally of the sockets. The device can be applied to any existing vehicle and may, of course, be installed in vehicles now building.

Having thus described the invention, I claim:

Apparatus for the purpose set forth comprising a pivot member, an equalizer bar mounted on said pivot member, links, means for establishing universal connections between the outer ends of the links and the sills of an automobile chassis, tubular sockets at the inner ends of the links having keyhole slots in their bottoms, pins carried by the ends of the equalizer bar and rising through said slots and provided within said sockets with balls, cupped washers within the sockets engaging opposite sides of the balls, an expansion spring in each socket between the inner washer and the base of the socket, a plug fitted in the outer end of the socket and bearing against the outer washer, and means for locking the plug in place.

In testimony whereof I affix my signature.

THERON J. APPLEBAKER. [L. S.]